United States Patent
Xu et al.

(10) Patent No.: US 10,812,740 B2
(45) Date of Patent: Oct. 20, 2020

(54) PIXEL UNIT AND DENOISING METHOD THEREFOR, DYNAMIC VISION SENSOR AND IMAGING APPARATUS

(71) Applicant: SHENZHEN UNIVERSITY, Shenzhen, Guangdong (CN)

(72) Inventors: Yuan Xu, Guangdong (CN); Zhiyu Huang, Guangdong (CN); Shiqi Liu, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 16/497,791

(22) PCT Filed: Jan. 9, 2018

(86) PCT No.: PCT/CN2018/071981
§ 371 (c)(1),
(2) Date: Sep. 25, 2019

(87) PCT Pub. No.: WO2018/176986
PCT Pub. Date: Oct. 4, 2018

(65) Prior Publication Data
US 2020/0029033 A1   Jan. 23, 2020

(30) Foreign Application Priority Data

Mar. 30, 2017  (CN) .......................... 2017 1 0203429

(51) Int. Cl.
*H04N 5/357*  (2011.01)
*H04N 5/374*  (2011.01)

(52) U.S. Cl.
CPC ............. *H04N 5/357* (2013.01); *H04N 5/374* (2013.01)

(58) Field of Classification Search
CPC ...... H04N 5/357; H04N 5/374; H04N 5/3572; H04N 5/35721; H04N 5/363
See application file for complete search history.

(56) References Cited

U.S. PATENT DOCUMENTS

| | | | |
|---|---|---|---|
| 2005/0128328 A1* | 6/2005 | Kakumoto | H04N 5/235 348/308 |
| 2006/0011806 A1* | 1/2006 | Heim | H04N 3/155 250/208.1 |

* cited by examiner

*Primary Examiner* — Yogesh K Aggarwal (57) ABSTRACT

The invention relates to a pixel unit of a dynamic vision sensor. The pixel unit comprises a pixel photosensitive circuit for detecting an optical signal, and generating and outputting an electrical signal when a change in the optical signal is detected; and a communication circuit connected to the pixel photosensitive circuit; and further comprises: a neighborhood denoising circuit connected to the pixel photosensitive circuit, the communication circuit and other pixel units in four neighborhoods, for controlling—whether the communication circuit outputs the electrical signal. In embodiments of the invention, when a pixel unit executes a response trigger event for an optical signal, and if at least three of the pixel units in the four neighborhoods are in a non-response state, the pixel unit does not respond, thereby effectively avoiding the generation of isolated noise, and having beneficial effects of a fast processing speed and a high denoising accuracy.

20 Claims, 7 Drawing Sheets

PIXEL UNIT AND DENOISING METHOD THEREFOR, DYNAMIC VISION SENSOR AND IMAGING APPARATUS

TECHNICAL FIELD

The invention relates to the field of image sensors, and more specifically, particular to a pixel unit and a denoising method therefor, a dynamic vision sensor, and an imaging apparatus.

BACKGROUND ART

A dynamic vision sensor is an address event representation (AER)-based CMOS asynchronous image sensor. Compared with the conventional image sensor that outputs pixel information in the form of a frame, the dynamic vision sensor imitates the working mechanism of biological retinal nerves and adopts asynchronous AER to output only pixel addresses and information with light intensity changes, instead of reading each piece of intra-frame pixel information in sequence. It is featured with real-time dynamic response to scene changes, image ultra-sparse representation, asynchronous output of time-domain change events, etc., can solve the defects brought by the conventional image sensor frame sampling method, such as high redundancy, high delay, high noise, low dynamic range, and transmission bottleneck, and is suitable for the visual field with high speed and high real-time application.

Figure 1:
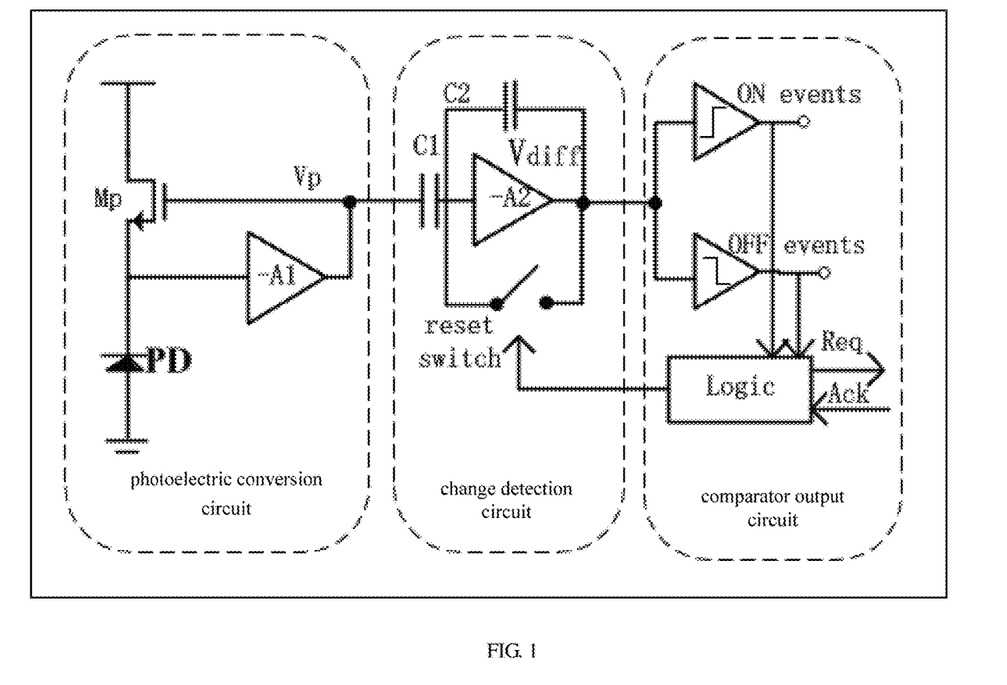
FIG. 1 is a schematic structural diagram of a pixel photosensitive circuit according to the invention.

A pixel photosensitive circuit of an existing dynamic vision sensor is, as shown in FIG. 1, mainly divided into three parts: a photoelectric conversion circuit, a change detection circuit, and a comparator output circuit. Its main function is to detect whether an optical signal changes and respond correspondingly. The circuit structure inputs an optical signal and outputs a voltage pulse signal, and its pulse width can reach a nanosecond level. If the optical signal is changing, a pulse is output, and the greater the change is, the smaller a pulse interval is, and vice versa. If the optical signal does not change, no pulse is output. The dynamic vision sensor has many advantages, but the structure has some non-ignorable disadvantages. Firstly, the noise in the static background is too large. Background noise mainly comes from the sensitivity of pixels to change detection. With high sensitivity, it also brings the defect of being easily affected by noise, especially a switch capacitor circuit in a pixel structure can detect a voltage peak value of about 20 mV. Therefore, this structure is very sensitive to thermal noise and node leakage current in the circuit. Secondly, changing pixels respond and are output as independent units, and there is no information exchange between them, which is contrary to the biological retinal structure.

At present, the background noise of the dynamic vision sensor is mostly removed by post-processing methods, including JAVA-based jAER processing algorithms and time-dependent digital-analog hybrid circuit processing methods. The JAVA-based processing method is too slow in speed, which is not conducive to the subsequent implementation of algorithms such as tracking detection. The time-dependent method makes difference by caching data, adding unnecessary delay to time.

SUMMARY OF THE INVENTION

The technical problem to be solved by the invention is to provide a pixel unit and a denoising method therefor, a dynamic vision sensor, and an imaging apparatus with respect to the defect in the prior art that the processing speed is too slow when the problem of background noise of the dynamic vision sensor processed with a software processing algorithm is solved.

The technical solution of the invention adopted to solve the technical problem is to construct a pixel unit of a dynamic vision sensor.

The pixel unit comprises:
a pixel photosensitive circuit for detecting an optical signal, and generating and outputting an electrical signal when a change in the optical signal is detected; and
a communication circuit connected to the pixel photosensitive circuit and outputting the electrical signal;
characterized by further comprising:
a neighborhood denoising circuit connected to the pixel photosensitive circuit, the communication circuit and other pixel units in four neighborhoods, for controlling, according to response states of adjacent pixel units, whether the communication circuit outputs the electrical signal.

The invention further constructs a dynamic vision sensor, comprising:
a pixel array consisting of multiple pixel units as described above, and outputting electrical signals generated after the pixel units in the array sense an optical signal,
wherein an excitation signal output end of each of the pixel units is connected to neighborhood denoising circuits of other pixel units in neighborhoods of the pixel unit.

The invention further constructs a denoising method of pixel units of a dynamic vision sensor, comprising steps of:
when a central pixel unit detects a change in an optical signal, triggering and acquiring response states of other pixel units in four neighborhoods;
judging whether at least three of the other pixel units in the four neighborhoods are in a non-response state; and
if yes, the central pixel unit not responding to the change in the optical signal.

The invention further constructs an imaging device, comprising:
the dynamic vision sensor as described above;
an image processing unit processing an electrical signal input by the dynamic vision sensor, and generating and outputting picture data or dynamic image data;
a storage unit storing the picture data or the dynamic image data generated by the image processing unit; and
a transmitting unit enabling an external device to establish connection communication with the storage unit.

Embodiments of the invention provide a pixel unit and a denoising method therefor, a dynamic vision sensor, and an imaging device. A neighborhood denoising circuit built by hardware is adopted. When a pixel unit executes a response trigger event for an optical signal, state information of pixel units in four neighborhoods is acquired and states thereof are determined, and if at least three of the pixel units in the four neighborhoods are in a non-response state, the pixel unit does not respond, thereby effectively avoiding the generation of isolated noise, and having beneficial effects of a fast processing speed and a high denoising accuracy.

BRIEF DESCRIPTION OF THE DRAWINGS

Hereinafter, the invention is further described with reference to the accompanying drawings and embodiments. In the drawings.

DETAILED EMBODIMENT OF THE INVENTION

Hereinafter the invention is described in further detail with reference to the accompanying drawings and embodiments so as to make the objectives, technical solutions, and advantages of the invention more comprehensible. It should be appreciated that specific embodiments described here are merely used to explain the invention but not to limit the invention.

Figure 2:
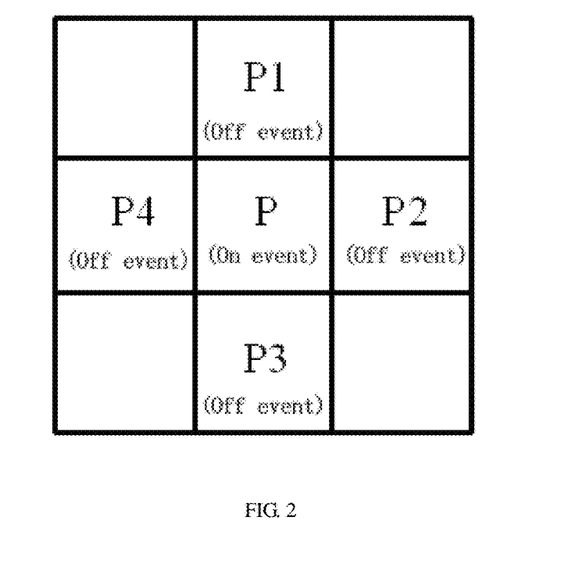
FIG. 2 is a schematic diagram of relationships between four-neighborhood isolated noise points and states of pixel units in the neighborhoods according to a first embodiment of the invention.

Referring to FIG. 2, a schematic diagram of relationships between isolated noise points in four neighborhoods and states of pixel units 1 in the neighborhoods according to an embodiment of the invention is shown.

Most of the background noise in an image output by an ordinary dynamic vision sensor is isolated noise, which generally includes three-neighborhood isolated noise or four-neighborhood isolated noise, and the four-neighborhood isolated noise is more than 95%. Specifically, when a pixel unit 1P receives a response event, it will be converted to a response state. If four neighborhoods P1-P4 are still in a non-response state in this case, it may generally be considered that high sensitivity of the pixel unit 1P leads to forming of four-neighborhood isolated noise points, affecting the quality of images or video generated by the dynamic visual sensor.

Figure 3:
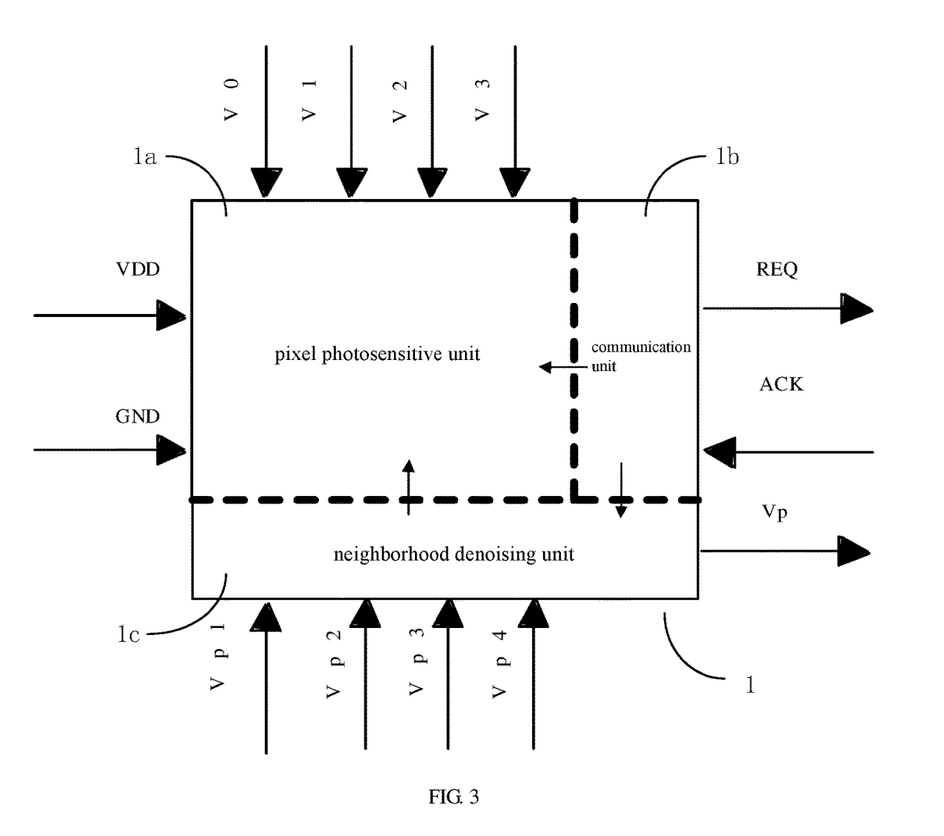
FIG. 3 is a schematic structural diagram of a pixel unit according to an embodiment of the invention.

Referring to FIG. 3, a structure of a pixel unit 1 according to an embodiment of the invention is shown. The structure of the pixel unit 1 comprises:

a pixel photosensitive circuit 1a for detecting an optical signal, and generating and outputting an electrical signal when a change in the optical signal is detected; and a communication circuit 1b connected to the pixel photosensitive circuit 1a and outputting the electrical signal; and further comprises a neighborhood denoising circuit 1c connected to the pixel photosensitive circuit 1a, the communication circuit 1b and other pixel units 1 in four neighborhoods, for controlling, according to response states of adjacent pixel units 1, whether the communication circuit 1b outputs the electrical signal.

In the embodiment of the invention, a specific structure of the pixel photosensitive circuit 1a can be obtained with reference to FIG. 1, including a photoelectric conversion circuit, a change detection circuit, and a comparator output circuit. Its main function is to detect whether an optical signal changes and respond correspondingly. The circuit structure inputs an optical signal and outputs a voltage pulse signal, and its pulse width can reach a nanosecond level. If the optical signal is changing, a pulse is output, and the greater the change is, the smaller a pulse interval is, and vice versa. If the optical signal does not change, no pulse is output.

The communication circuit 1b is connected to the comparator output circuit of the pixel photosensitive circuit 1a, for encoding an electrical signal output by the comparator output circuit and outputting it to an external device. Specifically, the communication circuit 1b is an AER circuit that outputs only pixel addresses and information with light intensity changes, instead of reading each piece of intra-frame pixel information in sequence.

The pixel unit 1 further comprises a neighborhood denoising circuit 1c connected to the pixel photosensitive circuit 1a, the communication circuit 1b and other pixel units 1 in four neighborhoods, for controlling, according to response states of adjacent pixel units 1, whether the communication circuit 1b outputs the electrical signal.

The pixel photosensitive circuit performs change detection through four different bias voltages V0-V3, and at the same time, the neighborhood denoising circuit receives excitation state signals $V_{p1}$-$V_{p4}$ of four-neighborhood pixels. If $V_{p1}$-$V_{p4}$ are all in a non-excited state in this case, a DVS detection result will be suppressed, and no request is output. Otherwise, the pixel photosensitive circuit sends an event request signal REQ externally through an AER circuit according to the detection result, and waits for an external acknowledgement signal ACK. Once the ACK is valid, the pixel photosensitive circuit needs to be reset and the excited state $V_p$ of the pixel needs to be output.

In the embodiment of the invention, a neighborhood denoising circuit built by hardware is adopted. When a pixel unit executes a response trigger event for an optical signal, excitation state signals of pixel units in four neighborhoods are acquired and states thereof are determined, and if at least three of the pixel units in the four neighborhoods are in a non-response state, the pixel unit does not respond, thereby effectively avoiding the generation of isolated noise, and having beneficial effects of low background noise, a fast processing speed, and a high denoising accuracy. Meanwhile, it should be appreciated that the pixel units in the four neighborhoods may be located on four adjacent sides of a central pixel unit, on the diagonal points of the central pixel unit, or other combinations of their adjacent positions.

Figure 4:
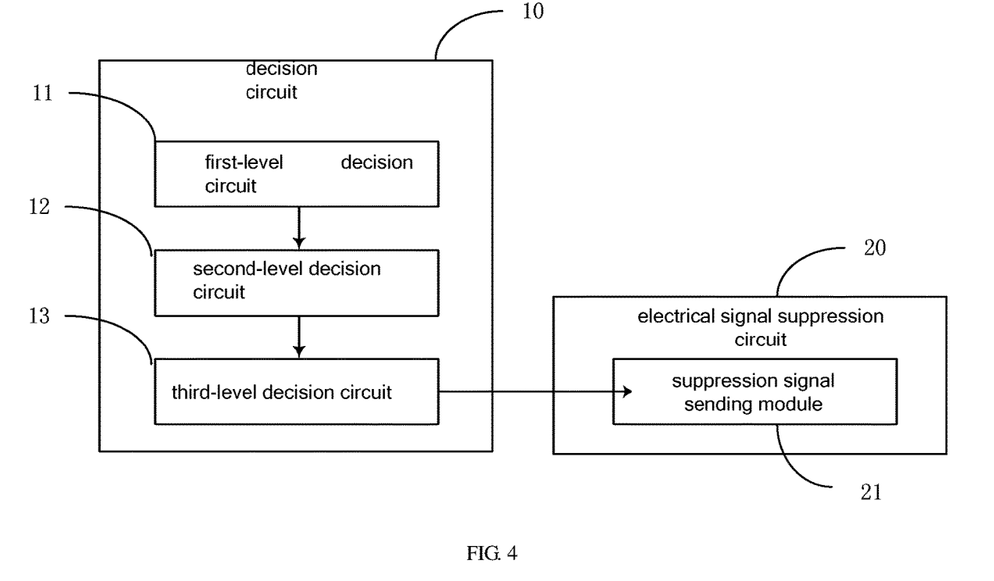
FIG. 4 is a schematic block diagram of functional modules of a neighborhood denoising circuit according to an embodiment of the invention.

Referring to FIG. 4, a schematic block diagram of functional modules of a neighborhood denoising unit 1c according to an embodiment of the invention is shown.

In the embodiment of the invention, the neighborhood denoising unit 1c comprises a decision circuit and an electrical signal suppression circuit 20. The decision circuit may compare excitation state signals output by two adjacent pixel units in the neighborhoods in a preset way respectively, and output decision result signals. Specifically, comparison is made in a preset way respectively, the hardware design of some decision circuits for deciding two or more input signals, such as a two-input or multi-input comparison circuit and a switch circuit, can be adopted to compare excitation state signals of pixel units in various neighborhoods input by combination and permutation at the same time, and it is simple and fast to know whether the pixel units in the neighborhoods are all in a non-response state, making it easy to determine whether the pixel units are neighborhood isolated noise points.

The electrical signal suppression circuit 20 outputs a suppression signal to the communication circuit 1b to control the communication circuit 1b not to output the electrical signal when adjacent pixel units corresponding to the decision result signals are all in a non-response state.

As an embodiment of the invention, the decision circuit comprises a first-level decision circuit 11, a second-level decision circuit 12, and a third-level decision circuit 13.

The first-level decision circuit 11 whose input end is connected to state output ends of the other pixel units in the four neighborhoods of the pixel unit respectively, is used for deciding response states of two adjacent pixel units in the neighborhoods, and outputting first-level decision results, wherein when the two pixel units for decision are both in a non-response state, a first state signal is output. Specifically, other pixel units in the four neighborhoods will all send excitation state signals corresponding to response states to the neighborhood denoising circuits 1c of the pixel units, and the neighborhood denoising circuits 1c will compare and decide the excitation state signals pairwise.

The second-level decision circuit 12 whose input end is connected to an output end of the first-level decision circuit 11, is used for deciding two different first-level decision results, and outputting second-level decision results, wherein when the two first-level decision results for decision are both the first state signal, a second state signal is output. The second-level decision circuit is intended to compare state signals output by the first-level decision circuit 11 to determine states of the pixel units in the four neighborhoods by comparison. As long as one of the pixel units in the neighborhoods is in a response state, input of the first state signal is definitely missing in one group of the second-level decision results, so that the second state signal is not output according to the second-level decision of this group.

The third-level decision circuit 13 whose input end is connected to an output end of the second-level decision circuit 12, is used for making decision according to state signals output based on two second-level decision results after decision made by the second-level decision circuit 12, and outputting third-level decision results, wherein when the two second-level decision results for decision are both the second state signal, a third state signal is output. The principle thereof is the same as that of the first-level decision circuit 11 and the second-level decision circuit 12, for making final decision on the state signal output by the second-level decision circuit 12, so that response states of four pixel units in the neighborhoods can be finally determined. If the third-level decision circuit 13 outputs a third state signal, it indicates that the pixel units in the neighborhoods are all in a non-response state.

The electrical signal suppression circuit 20 comprises a suppression signal sending module 21 which sends a suppression signal to the communication circuit 1b when the third-level decision result is received as the third state signal. Generally, when a central pixel unit has an excitation response event, it will send a request signal externally through the communication circuit 1b. After receiving the suppression signal, the communication circuit 1b will invalidate the request signal sent by the pixel unit, so as not to respond to a read request of the pixel unit.

Figure 5:
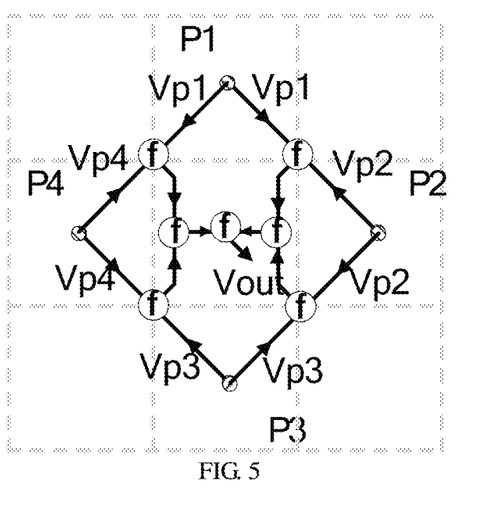
FIG. 5 is a schematic diagram of a decision process of a neighborhood denoising circuit according to an embodiment of the invention.

Referring to FIG. 5, a schematic diagram of a decision process of a neighborhood denoising circuit 1c according to an embodiment of the invention is shown.

In the embodiment of the invention, by inputting the excitation state signals output by four pixel units in the neighborhoods to the third-level decision circuit for comparison and decision, it can be fast and accurately obtained whether the pixel units in the neighborhoods are all in a non-response state, for example, assuming that first, second, third, and fourth pixel units in the neighborhoods are P1, P2, P3, and P4, wherein First-level decision: state signals output by P1 and P2 are decided, and a decision result thereof is $V_{out12}$; excitation state signals output by P2 and P3 are decided, and a decision result thereof is $V_{out23}$; excitation state signals output by P3 and P4 are decided, and a decision result thereof is $V_{out34}$; excitation state signals output by P1 and P4 are decided, and a decision result thereof is $V_{out14}$. $V_{out12}$, $V_{out23}$, $V_{out34}$, and $V_{out14}$ serve as next-level inputs.

Second-level decision: $V_{out12}$ and $V_{out23}$ are decided, and a decision result thereof is $V_{out123}$; $V_{out34}$ and $V_{out41}$ are decided, and a decision result thereof is $V_{out134}$-$V_{out123}$ and $V_{out134}$ serve as next-level inputs.

Third-level decision: $V_{out123}$ and $V_{out134}$ are decided, and a decision result thereof is $V_{out}$.

Assuming that the first state signal, the second state signal, and the third state signal are all at a high level, others are all at a low level. If $V_{out}$ needs to be at a high level, $V_{out123}$ and $V_{out134}$ in the second-level decision need to be at a high level. Thus, it can be reversely inferred that $V_{out12}$, $V_{out23}$, $V_{out34}$, and $V_{out14}$ in the first-level decision also need to be at a high level. Since a high level can be output only when response states corresponding to two excitation state signals for comparison are both in a non-response state in the first-level decision, it can be known that the four pixel units in the neighborhoods are all in a non-response state.

In the embodiment of the invention, some decision circuit hardware for deciding two or more input signals, such as a two-input or multi-input comparison circuit and a switch circuit, can be adopted in each level of decision circuits, and an output end of each level of decision circuits is connected to an input end of a next-level decision circuit to realize three-level decision. Then it is simple and fast to know whether the pixel units in the neighborhoods are all in a non-response state. Definitely, the third-level decision circuit is a preferred embodiment of the invention, and the multi-input first-level decision, second-level decision or even more multi-level decision can be selected to determine response states of the pixel units in the neighborhoods.

Figure 6:
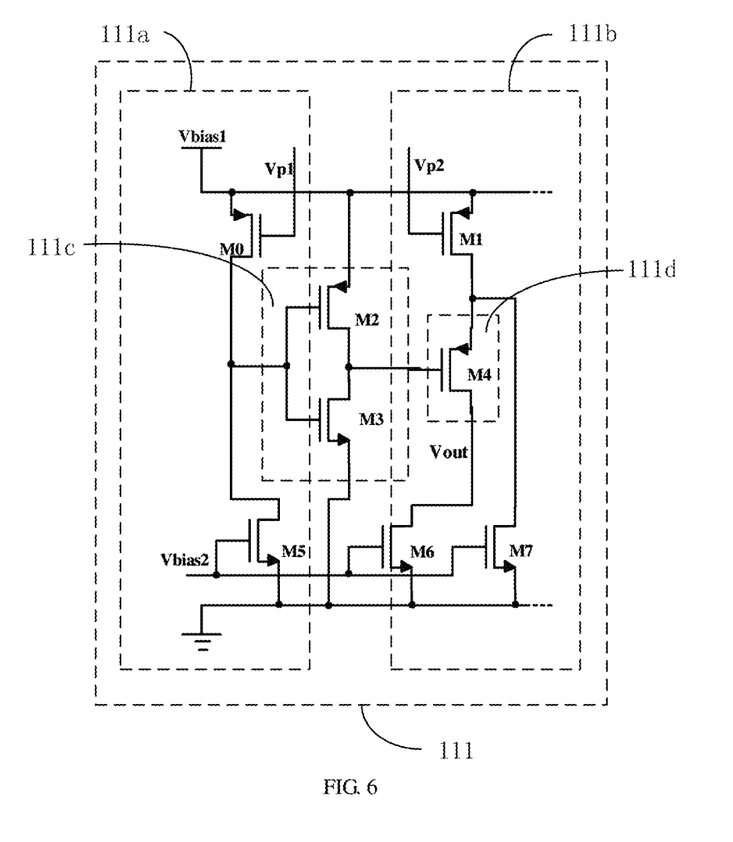
FIG. 6 is a schematic diagram of the principle of a two-input denoising circuit according to an embodiment of the invention.

Referring to FIG. 6, a schematic diagram of the principle of a two-input denoising circuit according to an embodiment of the invention is shown.

As an embodiment of the invention, referring to FIG. 4, the first-level decision circuit 11, the second-level decision circuit 12, and the third-level decision circuit 13 comprise multiple groups of two-input noise suppression units 111 for deciding an input signal, and the two-input noise suppression units 111 comprise a first signal input subunit 111a, a second signal input subunit 111b, an inverter 111c, and a decision unit 111d, wherein the first signal input subunit 111a comprises:

a first signal input mos transistor M0 and a first pull-down mos transistor M5, wherein the gate of the first signal input mos transistor M0 is connected to a first input signal source $V_{p1}$, the source thereof is connected to a first offset voltage source, the drain of the first pull-down mos transistor M5 is connected to the drain of the first signal input mos transistor M0, and the gate thereof is connected to a second offset voltage source;

the second signal input subunit 111b comprises: a second signal input mos transistor M1 and a second pull-down mos transistor M6, wherein the gate of the second signal input mos transistor M1 is connected to a second input signal source, the source thereof is connected to the first offset voltage source, the gate of the second pull-down mos transistor M6 is connected to the second offset voltage source, and the source thereof is connected to the source of the first pull-down mos transistor M5;

the inverter 111c comprises: a first inverting mos transistor M2 and a second inverting mos transistor M3, wherein the source of the first inverting mos transistor M2 is connected to the first offset voltage source, the drain thereof is connected to the drain of the second inverting mos transistor M3, and the gate of the first inverting mos transistor M2 and the gate of the second inverting mos transistor M3 form an input end of the inverter 111c, and are connected to the drain of the first signal input mos transistor M0; and the decision unit 111d comprises: a decision mos transistor M4, wherein the source of the decision mos transistor M4 is connected to the drain of the second signal input mos transistor M1, the drain thereof is connected to the drain of the second pull-down mos transistor, and the gate thereof is connected to an output end of the inverter 111c formed by the drain of the first inverting mos transistor M2 and the drain of the second inverting mos transistor M3; the drain serves as an output end of the two-input noise suppression unit 111 to output a decision state signal between a first input signal and a second input signal.

mos transistors of M1 and M2 serve as a buffer level for input signals. When the voltage of $V_{p1}/V_{p2}$ is lower than $V_{th}$+VDD, M0/M1 begins to switch on. Due to the low impedance of pMOS when it is on, the drain voltage can basically reach VDD. M2 and M3 form an inverter 111c with a gain of 1, and the drain voltage of M0 is transmitted to the gate of M4 through the inverter 111c. M4 serves as a transistor for deciding $V_{p1}$ and $V_{p2}$ signals. When $V_{p1}$, $V_{p2}$ is greater than VDD+$V_{th}$, M0, M1, and M4 are not turned on as they are in a cutoff region, values of the source voltage $V_{M0-S}$, $V_{M1-S}$ and $V_{M4-S}$ are pulled down, and M4, M5, and M6 serve as pull-down resistors. When $V_{p2}$, $V_{p1}$ is less than VDD+$V_{th}$, as M0, M1, and M4 are in a saturation region, source voltage values $V_{M0-S}$, $V_{M1-S}$ and $V_{M4-S}$ are pulled up, and $V_{out}$=$V_{M4-S}$. It can be known from the above process that low-level signals $V_{p1}$ and $V_{p2}$ are transmitted to $V_{out}$ with a relatively small voltage drop, and $V_{out}$ is effective at the high level, whose variation trend is opposite to that of $V_{p1}$ and $V_{p2}$. The $V_{out}$ signal is input into the pixel photosensitive circuit of the pixel unit, affecting the current request state of the pixel unit. If the output signal $V_{out}$ is at a high level, the request signal of the pixel unit is forced into an invalid state to suppress isolated noise in the static background.

Figure 7:
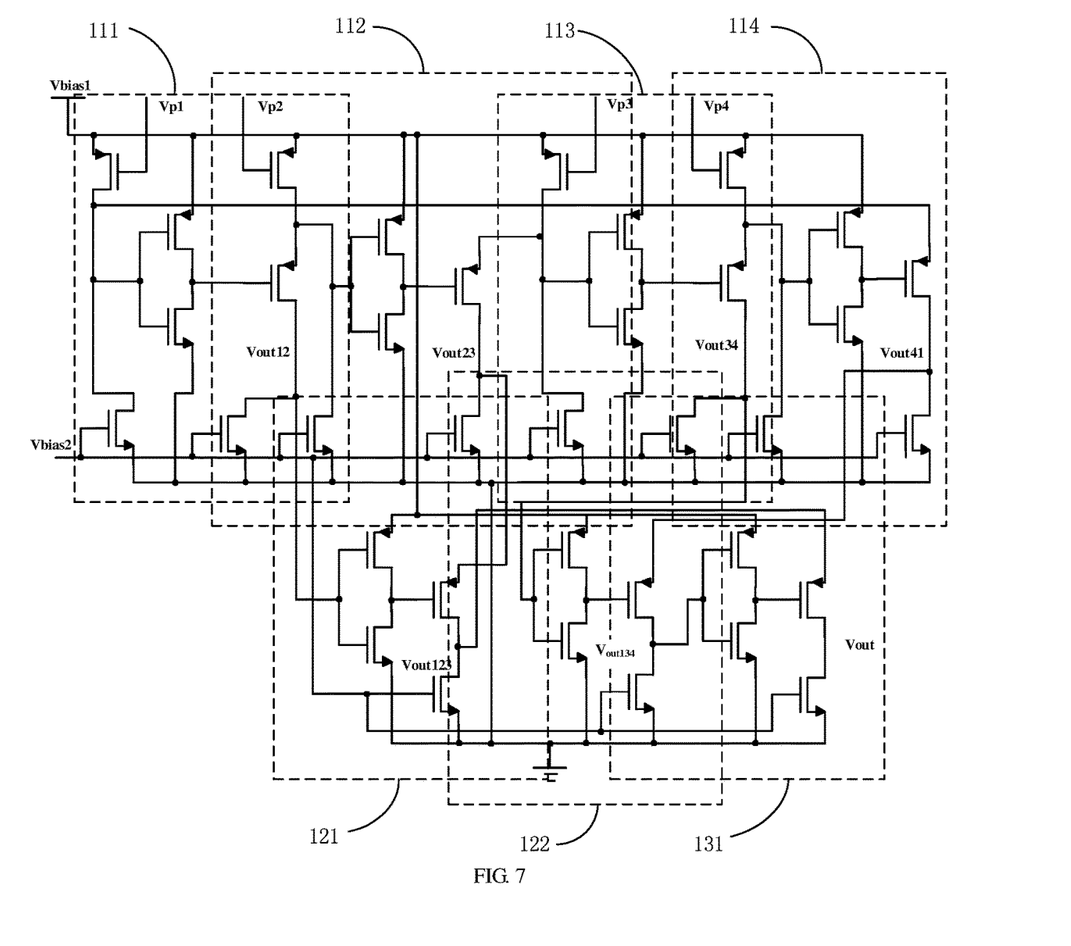
FIG. 7 is a schematic diagram of the principle of a neighborhood denoising circuit according to an embodiment of the invention.

Referring to FIG. 7, a schematic diagram of the principle of a neighborhood denoising circuit 1c according to an embodiment of the invention is shown.

In the embodiment of the invention, the first-level decision circuit consists of four signal input subunits, wherein the first signal input subunit and the second signal input subunit form a first two-input noise suppression unit 111 to output a first decision state signal $V_{out12}$; the second signal input subunit and the third signal input subunit form a second two-input noise suppression unit 112 to output a second decision state signal $V_{out23}$; the third signal input subunit and the fourth signal input subunit form a third two-input noise suppression unit 113 to output a third decision state signal $V_{out34}$; and the fourth signal input subunit and the first signal input subunit form a fourth two-input noise suppression unit 114 to output a fourth decision state signal $V_{out41}$;

the second-level decision circuit consists of four signal input subunits, wherein the first decision state signal and the second decision state signal are input to a fifth two-input noise suppression unit 121 formed by the fifth signal input subunit and a sixth signal input subunit to output a fifth decision state signal $V_{out123}$; and the third decision state signal and the fourth decision state signal are input to a sixth two-input noise suppression unit 122 formed by a seventh signal input subunit and an eighth signal input subunit to output a sixth decision state signal $V_{out134}$; and the third-level decision circuit consists of two signal input subunits, wherein the fifth decision state signal and the sixth decision state signal are input to a seventh two-input noise suppression unit 131 formed by the fifth signal input subunit and the sixth signal input subunit to output a third-level decision result $V_{out}$ finally decided by the neighborhood denoising circuit 1c.

The three-level decision circuit formed by two-input noise suppression units can make the pixel unit avoid the problem of too many background noise points caused by misjudgment or too high sensitivity. In addition, it is featured with a simple structure, a fast hardware processing speed, and a high decision accuracy, and thus is suitable for integration into pixel units to effectively improve the imaging quality of the dynamic vision sensor.

Figure 8:
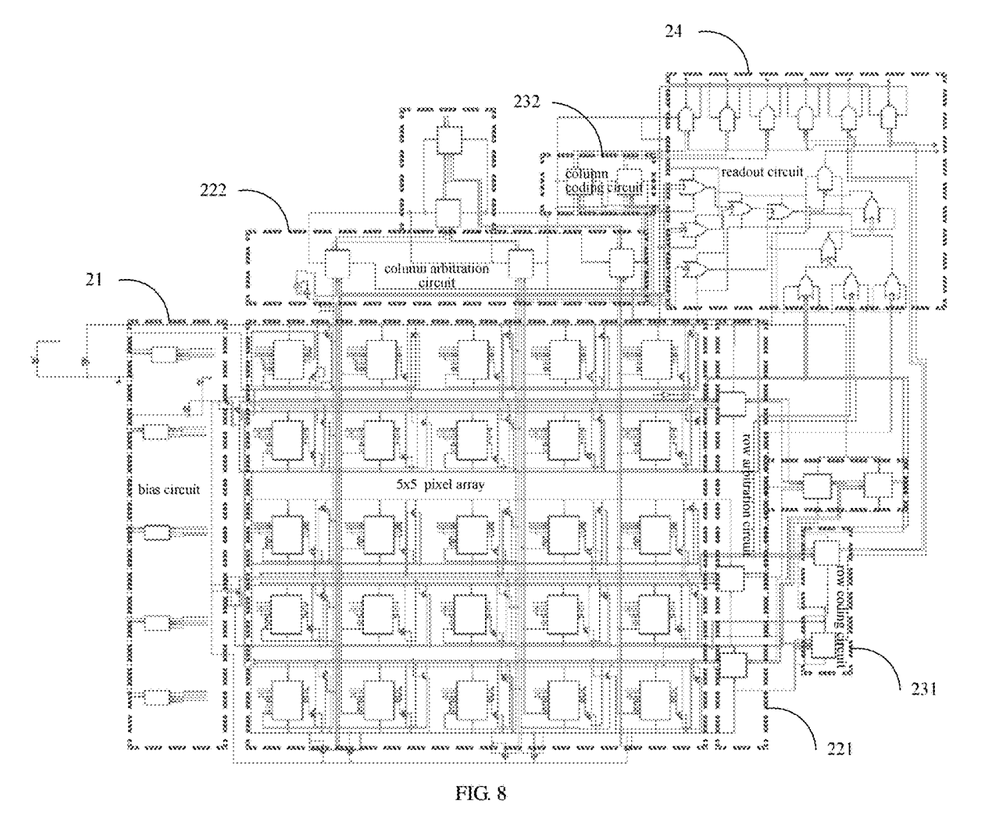
FIG. 8 is a schematic structural diagram of a dynamic vision sensor according to an embodiment of the invention.

Referring to FIG. 8, a schematic structural diagram of a dynamic vision sensor according to an embodiment of the invention is shown.

In the embodiment of the invention, the dynamic vision sensor comprises:

a pixel array consisting of multiple pixel units as shown in FIG. 2, and outputting electrical signals generated after the pixel units in the array sense an optical signal, wherein an excitation signal output end of each of the pixel units is connected to neighborhood denoising circuits 1c of other pixel units in neighborhoods of the pixel unit.

Specifically, as shown in the figure, the dynamic vision sensor chip is a dynamic vision sensor with an integrated neighborhood denoising structure formed by 5×5 pixel units, and the whole structure includes five major circuits, which are a 5×5 pixel array, a bias circuit 21, a row/column arbitration circuit 221/222, a row/column coding circuit 231/232, and a readout circuit 24 respectively. The row arbitration circuit 221 with five inputs receives a request signal of the pixel array and gives a corresponding acknowledgment signal after arbitration. The pixel unit obtaining the acknowledgment signal receives the acknowledgment signal of the arbitration circuit and sends the request signal through the communication circuit 1b to the column arbitration circuit 222 module, waiting for an acknowledgment. If there are no competing pixel units requesting signals at the same time point, the corresponding pixel will get a valid acknowledgment through the row/column arbitration circuit 221/222, and otherwise only the pixel obtaining a valid acknowledgment will perform the next operation. After the pixel array obtains the acknowledgment signal of the column arbitration circuit 222, the pixel photosensitive circuit of the pixel unit is reset, and the readout circuit will output a request at the same time. If the external acknowledgment signal is valid, an address encoded by the row/column encoding circuit 231/232 is output, thus completing an event request and output.

In the pixel array, as an excitation signal output end of each pixel unit is connected to the neighborhood denoising circuits of other pixel units in four neighborhoods of the pixel unit respectively, each pixel unit can judge isolated noise points of its excitation response event according to response states of the other pixel units in the neighborhoods, which can effectively avoid the generation of isolated noise, and have beneficial effects of low background noise, a fast processing speed, and high denoising accuracy.

Figure 9:
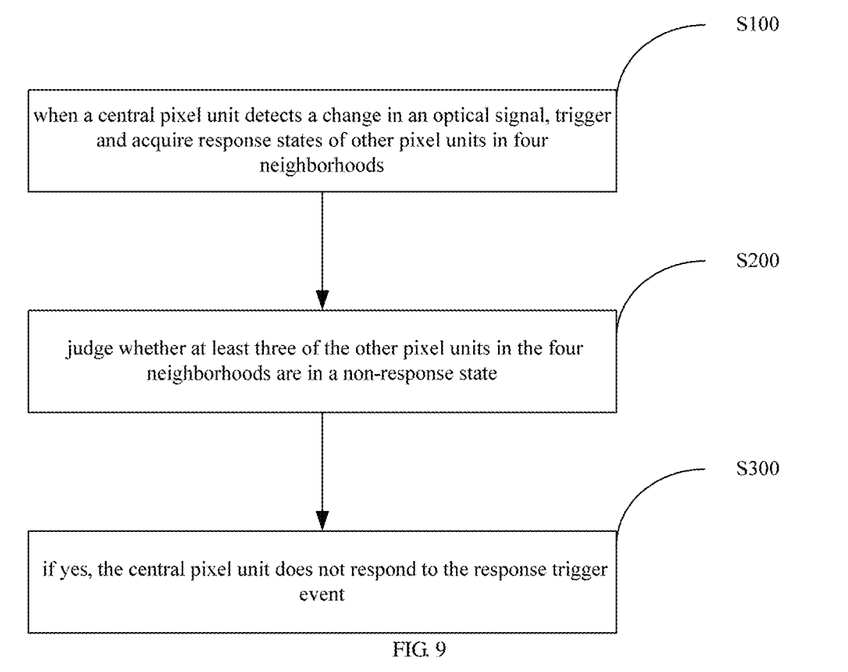
FIG. 9 is a flowchart of implementation of a denoising method of a pixel unit according to an embodiment of the invention.

Referring to FIG. 9, a flowchart of implementation of a denoising method of a pixel unit according to an embodiment of the invention is shown.

In the embodiment of the invention, the denoising method comprises the following steps:

in step S100, when a central pixel unit detects a change in an optical signal, response states of other pixel units in four neighborhoods are triggered and acquired.

In an actual application, the other pixel units in the four neighborhoods may all output excitation signals related to their own response states, and the central pixel unit obtains its response state by acquiring excitation signals input by the other pixel units in the neighborhoods.

In step S200, it is judged whether at least three of the other pixel units in the four neighborhoods are in a non-response state.

As an embodiment of the invention, since isolated noise in the four neighborhoods accounts for more than 95% of the background noise in an image output by the dynamic vision sensor, the solution of judging whether the other pixel units in the four neighborhoods are all in a non-response state is preferred in this embodiment. Definitely, it is also possible to only judge whether pixel units in three neighborhoods are in a non-response state.

In step S300, if yes, the central pixel unit does not respond to the response trigger event.

When at least three of the other pixel units in the four neighborhoods are detected to be in a non-response state, the request signal sent by the pixel unit will be invalidated so as not to respond to the read request of the pixel unit.

In the embodiment of the invention, when a pixel unit executes a response trigger event for an optical signal, state information of pixel units in four neighborhoods is acquired and states thereof are determined, and if at least three of the pixel units in the four neighborhoods are in a non-response state, the pixel unit does not respond, thereby effectively avoiding the generation of isolated noise, so that a dynamic vision sensor formed by the pixel units has beneficial effects of low background noise, a fast processing speed, and a high denoising accuracy. Meanwhile, it should be appreciated that the pixel units in the four neighborhoods may be located on four adjacent sides of the central pixel unit, on the diagonal points of the central pixel unit, or other combinations of their adjacent positions.

In the embodiment of the invention, the judging whether at least three of the other pixel units in the four neighborhoods are in a non-response state comprises:

comparing state signals output by two adjacent pixel units in the neighborhoods in a preset way respectively.

Figure 10:
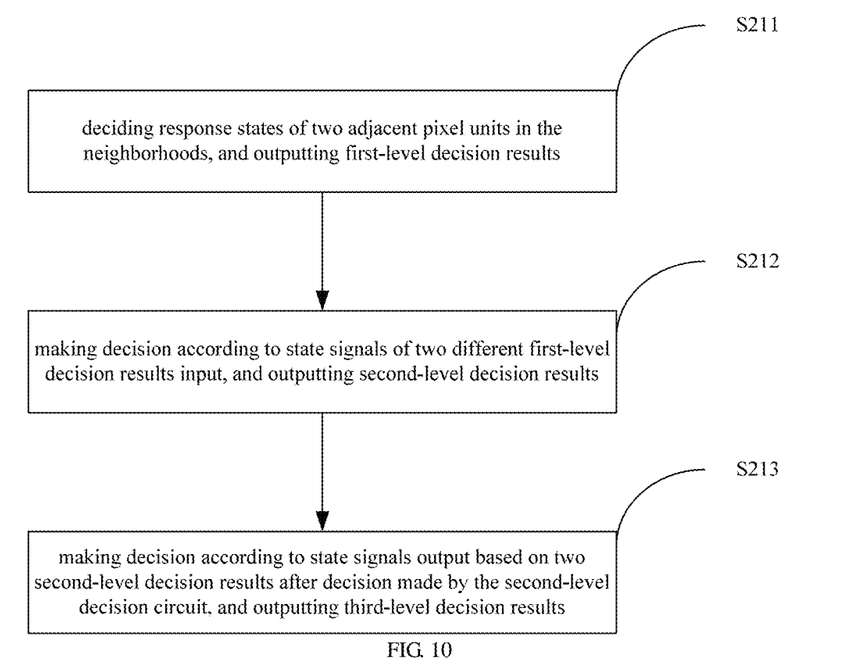
FIG. 10 is a flowchart of implementation of a state deciding process of pixel units in neighborhoods according to an embodiment of the invention.

Further, referring to FIG. 10, a flowchart of implementation of judging response states of pixel units in neighborhoods according to an embodiment of the invention is shown.

In the embodiment of the invention, the comparing state signals output by two adjacent pixel units in the neighborhoods in a preset way respectively comprises:

Step S211, deciding response states of two adjacent pixel units in the neighborhoods, and outputting first-level decision results, wherein when the two pixel units for decision are both in a non-response state, a first state signal is output;

Specifically, the other pixel units in the four neighborhoods will all send excitation state signals corresponding to response states to the pixel unit, and the pixel unit will compare and decide the excitation state signals pairwise.

Step S212, making decision according to state signals of two different first-level decision results input, and outputting second-level decision results, wherein when the two first-level decision results for decision are both the first state signal, a second state signal is output;

The second-level decision is intended to compare state signals output by the first-level decision to determine states of the pixel units in the four neighborhoods by comparison. As long as one of the pixel units in the neighborhoods is in a response state, input of the first state signal is definitely missing in one group of the second-level decision results, so that the second state signal is not output according to the second-level decision of this group.

Step S213, making decision according to state signals output based on two second-level decision results after decision made by the second-level decision circuit, and outputting third-level decision results, wherein when the two second-level decision results for decision are both the second state signal, a third state signal is output;

The principle thereof is the same as that of the first-level decision circuit 11 and the second-level decision circuit, for making final decision on the state signal output by the second-level decision circuit, so that response states of four pixel units in the neighborhoods can be finally determined. If the third-level decision circuit outputs a third state signal, it indicates that the pixel units in the neighborhoods are all in a non-response state.

In the embodiment of the invention, referring to FIG. 5, by inputting the excitation state signals output by four pixel units in the neighborhoods to the third-level decision circuit for comparison and decision, it can be fast and accurately obtained whether the pixel units in the neighborhoods are all in a non-response state, for example, assuming that first, second, third, and fourth pixel units in the neighborhoods are P1, P2, P3, and P4, wherein First-level decision: state signals output by P1 and P2 are decided, and a decision result thereof is $V_{out12}$; excitation state signals output by P2 and P3 are decided, and a decision result thereof is $V_{out23}$; excitation state signals output by P3 and P4 are decided, and a decision result thereof is $V_{out34}$; excitation state signals output by P1 and P4 are decided, and a decision result thereof is $V_{out14}$. $V_{out12}$, $V_{out23}$, $V_{out34}$, and $V_{out14}$ serve as next-level inputs.

Second-level decision: $V_{out12}$ and $V_{out23}$ are decided, and a decision result thereof is $V_{out123}$; $V_{out34}$ and $V_{out41}$ are decided, and a decision result thereof is $V_{out134}$. $V_{out123}$ and $V_{out134}$ serve as next-level inputs.

Third-level decision: $V_{out123}$ and $V_{out134}$ are decided, and a decision result thereof is $V_{out}$.

Assuming that the first state signal, the second state signal, and the third state signal are all at a high level, others are all at a low level. If $V_{out}$ needs to be at a high level, $V_{out123}$ and $V_{out134}$ in the second-level decision need to be at a high level. Thus, it can be reversely inferred that $V_{out12}$, $V_{out23}$, $V_{out34}$, and $V_{out14}$ in the first-level decision also need to be at a high level. Since a high level can be output only when response states corresponding to two excitation state signals for comparison are both in a non-response state in the first-level decision, it can be known that the four pixel units in the neighborhoods are all in a non-response state.

In the embodiment of the invention, some decision circuit hardware for deciding two or more input signals, such as a two-input or multi-input comparison circuit and a switch circuit, can be adopted in each level of decision circuits, and an output end of each level of decision circuits is connected to an input end of a next-level decision circuit to realize three-level decision. That is, it is simple and fast to know whether the pixel units in the neighborhoods are all in a non-response state. Definitely, the third-level decision circuit is a preferred embodiment of the invention, and the multi-input first-level decision, second-level decision or even more multi-level decision can be selected to determine response states of the pixel units in the neighborhoods.

Step 220, judging, according to the comparison results, whether four of the other pixel units in the four neighborhoods are in a non-response state.

In the embodiment of the invention, the other pixel units in the four neighborhoods are all in a non-response state if the third-level judgment result is outputting the third state signal.

Further, when the central pixel unit has an excitation response event and receives the third state signal, the communication circuit 1b of the central pixel unit does not respond to the request signal output by the pixel photosensitive circuit. In this way, when the pixel unit executes a response trigger event for an optical signal, state information of pixel units in four neighborhoods is acquired and states thereof are determined, and if the pixel units in the four neighborhoods are all in a non-response state, the pixel unit does not respond, thereby effectively avoiding the generation of isolated noise, so that a dynamic vision sensor formed by the pixel units has beneficial effects of low background noise, a fast processing speed, and a high denoising accuracy.

Those of ordinary skill in the art may understand that the implementation of all or part of the process in the above embodiment method may be completed by a computer program instructing related hardware. The program may be stored in a readable storage medium of a computer, a mobile phone, and other terminal devices. When executed, the program may include the process in the embodiment of the above method. The storage medium may be a magnetic disk, an optical disc, a Read-Only Memory (ROM), a Random Access Memory (RAM) or the like.

Figure 11:
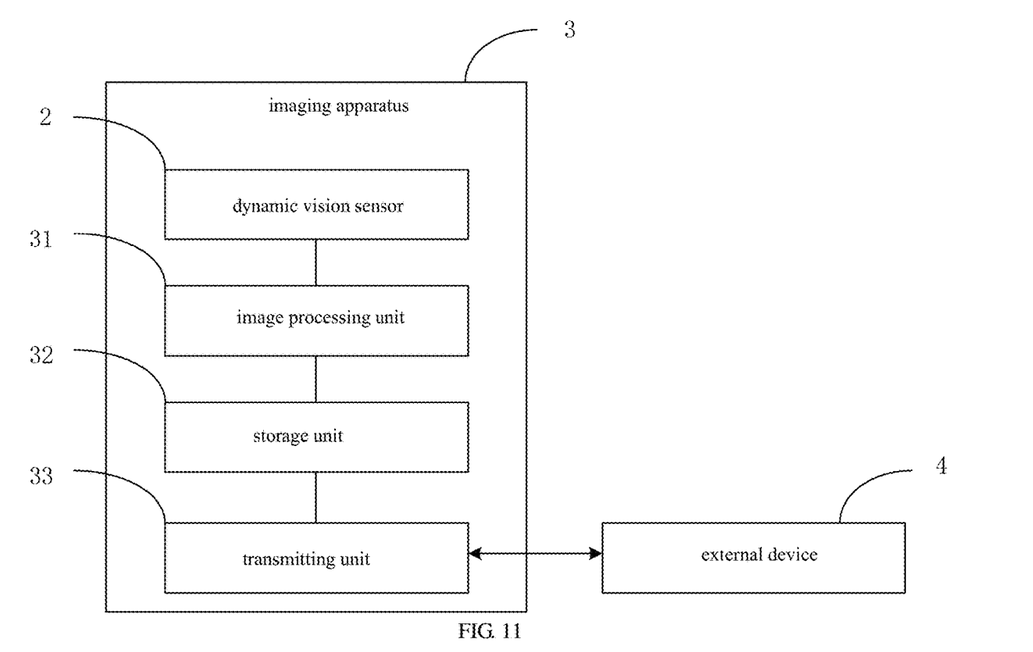
FIG. 11 is a block diagram of functional modules of an imaging device according to an embodiment of the invention.

Referring to FIG. 11, a block diagram of functional modules of an imaging device according to an embodiment of the invention is shown.

The imaging device comprises: the dynamic vision sensor as shown in FIG. 8; an image processing unit processing an electrical signal input by the dynamic vision sensor, and generating and outputting picture data or dynamic image data; a storage unit storing the picture data or the dynamic image data generated by the image processing unit; and a transmitting unit enabling an external device to establish connection communication with the storage unit.

In the embodiment of the invention, a specific structure of the imaging device can be obtained with reference to other imaging devices in the prior art. Those skilled in the art can easily learn about the specific structure, except that the imaging device in this embodiment uses a dynamic vision sensor integrated with a neighborhood denoising circuit 1c.

According to the imaging device using the dynamic sensor, when a pixel unit has a response trigger event, state information of pixel units in four neighborhoods is acquired and states thereof are determined, and if at least three of the pixel units in the four neighborhoods are all in a non-response state, the pixel unit does not respond, thereby effectively avoiding the generation of isolated noise in the imaging process, and having beneficial effects of low background noise, a fast processing speed, and a high denoising accuracy.

It should be appreciated that the above embodiments merely express preferred implementation manners of the invention, and their descriptions are relatively specific and detailed, but they cannot be interpreted as limitations to the patent scope of the invention. It should be noted that those of ordinary skill in the art can freely combine the above technical features and make several transformations and improvements without departing from the conception of the invention, all of which fall within the protection scope of the invention. Therefore, any equivalent transformations and modifications made according to the scope of the claims of the invention shall all fall within the scope of the claims of the invention.

What is claimed is:

1. A pixel unit, comprising:
   a pixel photosensitive circuit for detecting an optical signal, and generating and outputting an electrical signal when a change in the optical signal is detected; and
   a communication circuit connected to the pixel photosensitive circuit and outputting the electrical signal;
   characterized by further comprising:
   a neighborhood denoising circuit connected to the pixel photosensitive circuit, the communication circuit and other pixel units in four neighborhoods, for controlling, according to response states of adjacent pixel units, whether the communication circuit outputs the electrical signal.

2. The pixel unit according to claim 1, characterized in that the neighborhood denoising circuit comprises:
   a decision circuit comparing excitation state signals output by two adjacent pixel units in the four neighborhoods in a preset way respectively, and outputting decision result signals; and
   an electrical signal suppression circuit outputting a suppression signal to the communication circuit to control the communication circuit not to output the electrical signal when states of adjacent pixel units corresponding to the decision result signals are all non-response states.

3. The pixel unit according to claim 2, characterized in that the decision circuit comprises:
   a first-level decision circuit whose input end is connected to state output ends of the other pixel units in the four neighborhoods of the pixel unit respectively, for deciding response states of the two adjacent pixel units, and outputting first-level decision results, wherein when the two adjacent pixel units for decision are both in a non-response state, a first state signal is output;
   a second-level decision circuit whose input end is connected to an output end of the first-level decision circuit, for deciding two different first-level decision results, and outputting second-level decision results, wherein when the two first-level decision results for decision are both the first state signal, a second state signal is output; and
   a third-level decision circuit whose input end is connected to an output end of the second-level decision circuit, for deciding two different second-level decision results, and outputting third-level decision results, wherein when the two second-level decision results for decision are both the second state signal, a third state signal is output.

4. The pixel unit according to claim 3, characterized in that the electrical signal suppression circuit comprises:
   a suppression signal sending module sending the suppression signal to the communication circuit when the third-level decision results are received as the third state signal.

5. The pixel unit according to claim 3, characterized in that the first-level decision circuit, the second-level decision circuit, and the third-level decision circuit comprise multiple groups of two-input noise suppression units for deciding an input signal, and the two-input noise suppression units comprise a first signal input subunit, a second signal input subunit, an inverter, and a decision unit, wherein,
   the first signal input subunit comprises:
   a first signal input mos transistor and a first pull-down mos transistor, wherein a gate of the first signal input mos transistor is connected to a first input signal source, a source thereof is connected to a first offset voltage source, a drain of the first pull-down mos transistor is connected to a drain of the first signal input mos transistor, and a gate thereof is connected to a second offset voltage source;
   the second signal input subunit comprises:
   a second signal input mos transistor and a second pull-down mos transistor, wherein a gate of the second signal input mos transistor is connected to a second input signal source, a source thereof is connected to the first offset voltage source, a gate of the second pull-down mos transistor is connected to the second offset voltage source, and a source thereof is connected to a source of the first pull-down mos transistor;
   the inverter comprises:
   a first inverting mos transistor and a second inverting mos transistor, wherein a source of the first inverting mos transistor is connected to the first offset voltage source, a drain thereof is connected to a drain of the second inverting mos transistor, and a gate of the first inverting mos transistor and a gate of the second inverting mos transistor form an input end of the inverter, and are connected to the drain of the first signal input mos transistor; and
   the decision unit comprises:
   a decision mos transistor, wherein a source of the decision mos transistor is connected to a drain of the second signal input mos transistor, a drain thereof is connected to a drain of the second pull-down mos transistor, and a gate thereof is connected to an output end of the inverter formed by the drain of the first inverting mos transistor and the drain of the second inverting mos transistor; the drain serves as an output end of each of the two-input noise suppression unit to output a decision state signal between a first input signal and a second input signal.

6. The pixel unit according to claim 5, characterized in that, the first-level decision circuit consists of four signal input subunits, wherein the first signal input subunit and the second signal input subunit form a first two-input noise suppression unit to output a first decision state signal; the second signal input subunit and the third signal input subunit form a second two-input noise suppression unit to output a second decision state signal; the third signal input subunit and a fourth signal input subunit form a third two-input noise suppression unit to output a third decision state signal; and the fourth signal input subunit and the first signal input subunit form a fourth two-input noise suppression unit to output a fourth decision state signal;
   the second-level decision circuit consists of four signal input subunits, wherein the first decision state signal and the second decision state signal are input to a fifth two-input noise suppression unit formed by a fifth signal input subunit and a sixth signal input subunit to output a fifth decision state signal; and the third decision state signal and the fourth decision state signal are input to a sixth two-input noise suppression unit formed by a seventh signal input subunit and an eighth signal input subunit to output a sixth decision state signal; and
   the third-level decision circuit consists of two signal input subunits, wherein the fifth decision state signal and the sixth decision state signal are input to a seventh two-input noise suppression unit formed by the fifth signal input subunit and the sixth signal input subunit to output third-level decision results finally decided by the neighborhood denoising circuit.

7. A dynamic vision sensor, comprising:
   a pixel array consisting of multiple pixel units and the pixel unit, comprising:
   a pixel photosensitive circuit for detecting an optical signal, and generating and outputting an electrical signal when a change in the optical signal is detected; and a communication circuit connected to the pixel photosensitive circuit and outputting the electrical signal; characterized by further comprising:
   a neighborhood denoising circuit connected to the pixel photosensitive circuit, the communication circuit and other pixel units in four neighborhoods, for controlling, according to response states of adjacent pixel units, whether the communication circuit outputs the electrical signal; and outputting electrical signals generated after the pixel units in the array sense an optical signal, wherein an excitation signal output end of each of the pixel units is connected to neighborhood denoising circuits of other pixel units in neighborhoods of the pixel unit.

8. A denoising method of pixel units of a dynamic vision sensor, comprising steps of:
   when a central pixel unit detects a response trigger event, triggering and acquiring response states of other pixel units in four neighborhoods; judging whether at least three of the other pixel units in the four neighborhoods are in a non-response state; and if yes, the central pixel unit does not respond to the response trigger event.

9. The denoising method of a dynamic vision sensor according to claim 8, characterized in that the judging whether at least three of the other pixel units in the four neighborhoods are in a non-response state comprises:
   comparing state signals output by two adjacent pixel units in the four neighborhoods in a preset way respectively; and
   judging, according to the comparison results, whether four of the other pixel units in the four neighborhoods are in the non-response state.

10. The denoising method of a dynamic vision sensor according to claim 9, characterized in that the comparing state signals output by two adjacent pixel units in the four neighborhoods in a preset way respectively comprises:
   deciding response states of the two adjacent pixel units, and outputting first-level decision results, wherein when the two adjacent pixel units for decision are both in the non-response state, a first state signal is output;
   making decision according to state signals of two different first-level decision results input, and outputting second-level decision results, wherein when the two first-level decision results for decision are both the first state signal, a second state signal is output; and making decision according to state signals output based on two second-level decision results after decision made by a second-level decision circuit, and outputting third-level decision results, wherein when the two second-level decision results for decision are both the second state signal, a third state signal is output; and the judging, according to the comparison results, whether four of the other pixel units in the four neighborhoods are in the non-response state comprises:

other pixel units in the four neighborhoods being in the non-response state if a third-level judgment result is outputting the third state signal.

11. The denoising method of a dynamic vision sensor according to claim 8, characterized in that the central pixel unit not responding to the response trigger event comprises:

if yes, a communication unit of the central pixel unit does not respond to a request signal output by the pixel photosensitive circuit.

12. An imaging device, comprising: a dynamic vision sensor, comprising:

a pixel array consisting of multiple pixel units, and outputting electrical signals generated after the pixel units in the array sense an optical signal, wherein an excitation signal output end of each of the pixel units is connected to neighborhood denoising circuits of other pixel units in neighborhoods of the pixel unit;

an image processing unit processing an electrical signal input by the dynamic vision sensor, and generating and outputting picture data or dynamic image data;

a storage unit storing the picture data or the dynamic image data generated by the image processing unit; and a transmitting unit enabling an external device to establish connection communication with the storage unit;

and the pixel unit, comprising:

a pixel photosensitive circuit for detecting an optical signal, and generating and outputting an electrical signal when a change in the optical signal is detected; and a communication circuit connected to the pixel photosensitive circuit and outputting the electrical signal;

characterized by further comprising:

a neighborhood denoising circuit connected to the pixel photosensitive circuit, the communication circuit and other pixel units in four neighborhoods, for controlling, according to response states of adjacent pixel units, whether the communication circuit outputs the electrical signal.

13. The dynamic vision sensor according to claim 7, characterized in that the neighborhood denoising circuit comprises:

a decision circuit comparing excitation state signals output by two adjacent pixel units in the four neighborhoods in a preset way respectively, and outputting decision result signals; and an electrical signal suppression circuit outputting a suppression signal to the communication circuit to control the communication circuit not to output the electrical signal when states of adjacent pixel units corresponding to the decision result signals are all non-response states.

14. The dynamic vision sensor according to claim 13, characterized in that the decision circuit comprises:

a first-level decision circuit whose input end is connected to state output ends of the other pixel units in the four neighborhoods of the pixel unit respectively, for deciding response states of the two adjacent pixel units, and outputting first-level decision results, wherein when the two adjacent pixel units for decision are both in a non-response state, a first state signal is output;

a second-level decision circuit whose input end is connected to an output end of the first-level decision circuit, for deciding two different first-level decision results, and outputting second-level decision results, wherein when the two first-level decision results for decision are both the first state signal, a second state signal is output; and a third-level decision circuit whose input end is connected to an output end of the second-level decision circuit, for deciding two different second-level decision results, and outputting third-level decision results, wherein when the two second-level decision results for decision are both the second state signal, a third state signal is output.

15. The dynamic vision sensor according to claim 14, characterized in that the electrical signal suppression circuit comprises:

a suppression signal sending module sending the suppression signal to the communication circuit when the third-level decision results are received as the third state signal.

16. The dynamic vision sensor according to claim 14, characterized in that the first-level decision circuit, the second-level decision circuit, and the third-level decision circuit comprise multiple groups of two-input noise suppression units for deciding an input signal, and the two-input noise suppression units comprise a first signal input subunit, a second signal input subunit, an inverter, and a decision unit, wherein, the first signal input subunit comprises:

a first signal input mos transistor and a first pull-down mos transistor, wherein a gate of the first signal input mos transistor is connected to a first input signal source, a source thereof is connected to a first offset voltage source, a drain of the first pull-down mos transistor is connected to a drain of the first signal input mos transistor, and a gate thereof is connected to a second offset voltage source;

the second signal input subunit comprises:

a second signal input mos transistor and a second pull-down mos transistor, wherein a gate of the second signal input mos transistor is connected to a second input signal source, a source thereof is connected to the first offset voltage source, a gate of the second pull-down mos transistor is connected to the second offset voltage source, and a source thereof is connected to a source of the first pull-down mos transistor;

the inverter comprises:

a first inverting mos transistor and a second inverting mos transistor, wherein a source of the first inverting mos transistor is connected to the first offset voltage source, a drain thereof is connected to a drain of the second inverting mos transistor, and a gate of the first inverting mos transistor and a gate of the second inverting mos transistor form an input end of the inverter, and are connected to the drain of the first signal input mos transistor; and the decision unit comprises:

a decision mos transistor, wherein a source of the decision mos transistor is connected to a drain of the second signal input mos transistor, a drain thereof is connected to a drain of the second pull-down mos transistor, and a gate thereof is connected to an output end of the inverter formed by the drain of the first inverting mos transistor and the drain of the second inverting mos transistor; the drain serves as an output end of each of the two-input noise suppression unit to output a decision state signal between a first input signal and a second input signal.

17. The dynamic vision sensor according to claim 16, characterized in that, the first-level decision circuit consists of four signal input subunits, wherein the first signal input subunit and the second signal input subunit form a first two-input noise suppression unit to output a first decision state signal; the second signal input subunit and the third signal input subunit form a second two-input noise suppression unit to output a second decision state signal; the third signal input subunit and a fourth signal input subunit form a third two-input noise suppression unit to output a third decision state signal; and the fourth signal input subunit and the first signal input subunit form a fourth two-input noise suppression unit to output a fourth decision state signal;

the second-level decision circuit consists of four signal input subunits, wherein the first decision state signal and the second decision state signal are input to a fifth two-input noise suppression unit formed by a fifth signal input subunit and a sixth signal input subunit to output a fifth decision state signal; and the third decision state signal and the fourth decision state signal are input to a sixth two-input noise suppression unit formed by a seventh signal input subunit and an eighth signal input subunit to output a sixth decision state signal; and the third-level decision circuit consists of two signal input subunits, wherein the fifth decision state signal and the sixth decision state signal are input to a seventh two-input noise suppression unit formed by the fifth signal input subunit and the sixth signal input subunit to output third-level decision results finally decided by the neighborhood denoising circuit.

18. The imaging device according to claim 12, characterized in that the neighborhood denoising circuit comprises:

a decision circuit comparing excitation state signals output by two adjacent pixel units in the four neighborhoods in a preset way respectively, and outputting decision result signals; and an electrical signal suppression circuit outputting a suppression signal to the communication circuit to control the communication circuit not to output the electrical signal when states of adjacent pixel units corresponding to the decision result signals are all non-response states.

19. The imaging device according to claim 18, characterized in that the decision circuit comprises:

a first-level decision circuit whose input end is connected to state output ends of the other pixel units in the four neighborhoods of the pixel unit respectively, for deciding response states of the two adjacent pixel units, and outputting first-level decision results, wherein when the two adjacent pixel units for decision are both in a non-response state, a first state signal is output;

a second-level decision circuit whose input end is connected to an output end of the first-level decision circuit, for deciding two different first-level decision results, and outputting second-level decision results, wherein when the two first-level decision results for decision are both the first state signal, a second state signal is output; and a third-level decision circuit whose input end is connected to an output end of the second-level decision circuit, for deciding two different second-level decision results, and outputting third-level decision results, wherein when the two second-level decision results for decision are both the second state signal, a third state signal is output.

20. The imaging device according to claim 19, characterized in that the electrical signal suppression circuit comprises:

a suppression signal sending module sending the suppression signal to the communication circuit when the third-level decision results are received as the third state signal.

* * * * *